(12) United States Patent
Nakagawa et al.

(10) Patent No.: US 10,800,461 B2
(45) Date of Patent: Oct. 13, 2020

(54) VEHICLE PANEL STRUCTURE

(71) Applicant: SUBARU CORPORATION, Tokyo (JP)

(72) Inventors: Shuichi Nakagawa, Tokyo (JP); Satoru Hoshino, Tokyo (JP); Yuji Tanaka, Tokyo (JP); Tomoya Kawamura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 128 days.

(21) Appl. No.: 15/991,482

(22) Filed: May 29, 2018

(65) Prior Publication Data

US 2018/0346038 A1 Dec. 6, 2018

(30) Foreign Application Priority Data

Jun. 6, 2017 (JP) .................................. 2017-111310

(51) Int. Cl.
  *B60R 13/04* (2006.01)
  *B62D 25/20* (2006.01)
  *B60R 13/08* (2006.01)

(52) U.S. Cl.
  CPC .............. *B62D 25/20* (2013.01); *B60R 13/08* (2013.01)

(58) Field of Classification Search
  CPC ....... H01L 2924/00; H01L 2224/73265; H01L 2224/32225; H01L 2224/48227; H01L 2924/0002; B29C 66/71; B29C 66/1122; H01R 2201/26; Y02E 10/44
  See application file for complete search history.

(56) References Cited

U.S. PATENT DOCUMENTS

| 4,020,989 | A | * | 5/1977 | Kautz | .................. | A01G 9/1469 |
| | | | | | | 126/616 |
| 4,259,942 | A | * | 4/1981 | Katz | ....................... | F24S 10/73 |
| | | | | | | 126/676 |
| 4,411,121 | A | * | 10/1983 | Blacklin | ................. | E04C 2/326 |
| | | | | | | 52/630 |

(Continued)

FOREIGN PATENT DOCUMENTS

JP    2001-270470 A    10/2001
JP    2006-076394 A    3/2006
(Continued)

OTHER PUBLICATIONS

Japanese Office Action dated Dec. 4, 2018 in JP 2017-111310 (4 pages in Japanese with English translation).

*Primary Examiner* — Kiran B Patel
(74) *Attorney, Agent, or Firm* — Smith, Gambrell & Russell, LLP

(57) ABSTRACT

A vehicle panel structure includes a plate-like panel member. The plate-like panel member includes a substantially plate-like attaching area, a pair of projections, and a reinforcing projection. The substantially plate-like attaching area is attached to a vehicle body member. The pair of projections projects so as to be curved toward one side of the attaching area. The reinforcing projection projects between each member of the pair of projections so as to be curved toward the other side of the attaching area. The projections and the reinforcing projection are connected to each other with a connecting area therebetween so as to extend continuously in a curved shape.

5 Claims, 3 Drawing Sheets

(56) References Cited

U.S. PATENT DOCUMENTS

| | | | | |
|---|---|---|---|---|
| 4,898,419 | A | * | 2/1990 | Kenmochi ............ B62D 21/10 296/191 |
| 5,735,564 | A | * | 4/1998 | Coogan ................ B60R 21/026 280/748 |
| 6,015,178 | A | * | 1/2000 | Haack ................... B60R 13/01 296/39.2 |
| 6,017,075 | A | * | 1/2000 | Emery ................... B60R 13/01 296/39.1 |
| 6,170,905 | B1 | * | 1/2001 | Jurica ............... B62D 25/2054 296/184.1 |
| 6,439,649 | B1 | * | 8/2002 | Lorenzo .............. B62D 29/043 296/181.3 |
| 6,460,393 | B1 | * | 10/2002 | Sundhagen ............ B21D 22/04 72/328 |
| 6,675,620 | B1 | * | 1/2004 | Heyll ................... B21D 22/20 72/466.8 |
| 8,166,720 | B2 | * | 5/2012 | Garrigus ................ E04D 5/142 52/408 |
| 8,967,931 | B1 | * | 3/2015 | Brownlie ............... B60P 7/135 188/32 |
| 9,963,081 | B1 | * | 5/2018 | Taylor .................. B66F 7/0608 |
| 2004/0140690 | A1 | * | 7/2004 | Watanabe ............. B62D 25/20 296/184.1 |
| 2005/0040676 | A1 | * | 2/2005 | Kikuchi ............ B62D 25/2072 296/193.07 |
| 2005/0211496 | A1 | * | 9/2005 | Ito ....................... B60K 15/063 180/314 |
| 2005/0236860 | A1 | * | 10/2005 | Nagamoto ............... B60R 7/04 296/37.14 |
| 2007/0041701 | A1 | * | 2/2007 | Yang .................... G02B 6/0016 385/146 |
| 2007/0126264 | A1 | * | 6/2007 | Mizuma ................ B60N 2/015 296/204 |
| 2008/0111397 | A1 | * | 5/2008 | Yamada ................ B62D 25/14 296/193.09 |
| 2011/0272969 | A1 | * | 11/2011 | Mori ..................... B62D 21/10 296/193.07 |
| 2013/0229030 | A1 | * | 9/2013 | Yamaguchi ............. B60K 1/04 296/193.07 |
| 2013/0257100 | A1 | * | 10/2013 | Marchesano ............ F16B 2/22 296/191 |
| 2014/0338996 | A1 | * | 11/2014 | Baccouche .......... B62D 21/157 180/68.5 |
| 2015/0042128 | A1 | * | 2/2015 | Kowaki ............ B62D 25/2027 296/193.07 |
| 2015/0180078 | A1 | * | 6/2015 | Ikeda ..................... B60L 50/72 180/68.5 |
| 2016/0207572 | A1 | * | 7/2016 | Natsume ................ B62D 25/20 |
| 2016/0355213 | A1 | * | 12/2016 | Cesarano ........... B62D 25/2009 |
| 2016/0368542 | A1 | * | 12/2016 | Taylor ..................... B66F 7/28 |
| 2017/0305250 | A1 | * | 10/2017 | Hara ....................... B60K 1/04 |
| 2018/0170447 | A1 | * | 6/2018 | Iida .................... B62D 25/2018 |
| 2018/0273110 | A1 | * | 9/2018 | Masuda ................ B62D 25/02 |
| 2019/0185062 | A1 | * | 6/2019 | Kato .................... B62D 21/157 |
| 2019/0202375 | A1 | * | 7/2019 | Pelzer ..................... B60R 13/01 |

FOREIGN PATENT DOCUMENTS

| | | |
|---|---|---|
| JP | 2006-315627 A | 11/2006 |
| KR | 2016-0049206 A | 5/2016 |

* cited by examiner

A-A   B-B   C-C

VEHICLE PANEL STRUCTURE

CROSS-REFERENCE TO RELATED APPLICATIONS

The present application claims priority from Japanese Patent Application No. 2017-111310 filed on Jun. 6, 2017, the entire contents of which are hereby incorporated by reference.

BACKGROUND

1. Technical Field

The present invention relates to vehicle panel structures and, more particularly, to a vehicle panel structure suitable for a floor panel used in a floor of a passenger compartment.

2. Related Art

A floor panel constituting a floor of a passenger compartment typically consists of a panel member of a plate-like steel sheet. A flat, plate-like floor panel has poor rigidity and, for this reason, needs to undergo, for instance, bending to improve a rigidity. When a plate-like floor panel is subjected to bending process, projecting the panel member to the outside of the passenger compartment reduces minimum ground clearance, while projecting the panel member to the inside of the passenger compartment narrows the space of the passenger compartment, which is a trade-off. In a vehicle panel structure described in, for instance, Japanese Unexamined Patent Application Publication (JP-A) No. 2006-76394, a pair of projections formed by bending the inner side of a plate-like attaching area for attaching the floor panel to a frame, a cross member, or other vehicle body member is provided so as to project to the outside of the passenger compartment substantially in a curved shape with a bead provided between the projections, both the projections and the bead being provided in the panel member constituting the floor panel. The bead is square in plan view and projects to the opposite side of the projections between the pair of projections so as to be disposed substantially in line in the direction perpendicular to the direction in which the pair of projections is disposed. As a result, one member of the pair of projections, the bead, and the other member of the pair of projections form a wavy shape and improve the rigidity of the panel member while reducing the amount of projections to both the inside and outside of the passenger compartment. In addition, the improved rigidity increases the resonance frequency, thereby achieving a required reduction in road noise or other transmitted sound.

SUMMARY OF THE INVENTION

A first aspect of the present invention provides a vehicle panel structure including a plate-like panel member. The panel member includes a substantially plate-like attaching area that is attached to a vehicle body member, a pair of projections that projects so as to be curved toward one side of the attaching area, and a reinforcing projection that projects between the pair of projections so as to be curved toward the other side of the attaching area. The projections and the reinforcing projection are connected to each other with a connecting area therebetween so as to continuously extend in a curved shape.

DETAILED DESCRIPTION

Figure 1:
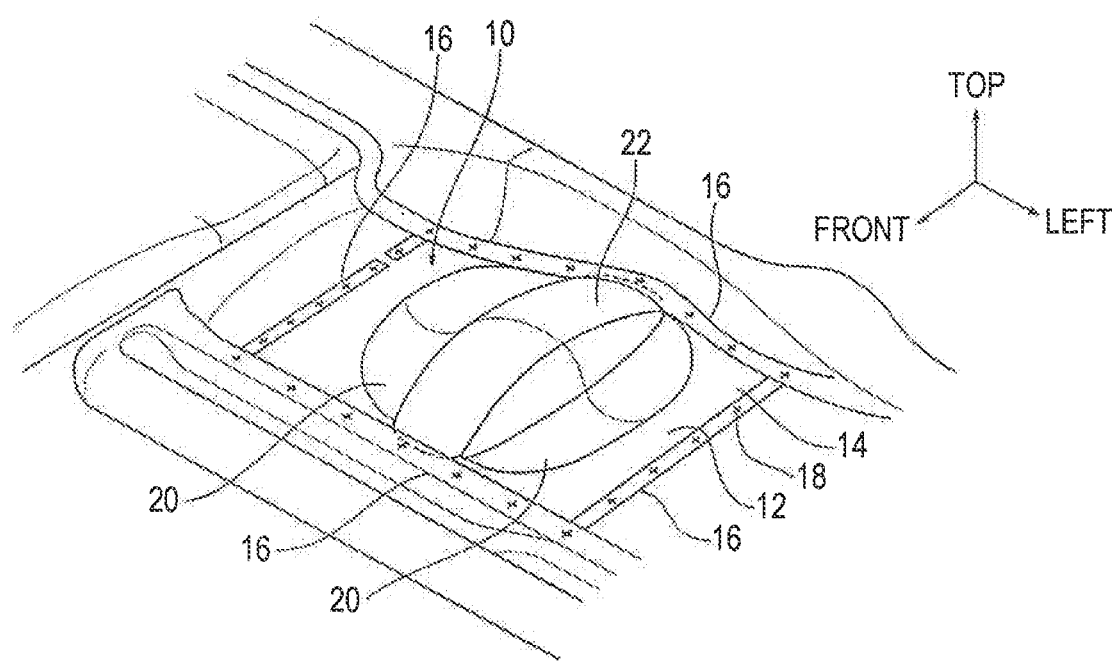
FIG. 1 is a perspective view of a floor panel having a vehicle panel structure according to an example of the present invention.

A vehicle panel structure according to an example of the present invention is described below in detail with reference to the attached drawings. It is to be noted that the same or equivalent parts are denoted by the same numeral in the drawings. Further, the same or equivalent components are denoted by the same numeral in the drawings and a duplicative description thereof will be omitted. Note that the following description is directed to an illustrative example of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following example implementations which are not recited in a most-generic independent claim of the disclosure are optional and may be provided on an as-needed basis. The drawings are schematic and are not intended to be drawn to scale.

In the vehicle panel structure described in JP-A No. 2006-76394, a part of the panel member is bent linearly in a connecting area between the projections and the bead that is square in plan view. In addition, another part of the panel member is also bent linearly even in a connecting area between the projections and the attaching area. Depending on the direction in which a load is exerted on the floor panel, these linearly bent parts of the panel member may cause a line (or folding line) from which folding originates, resulting in degraded rigidity.

It is desirable to provide a vehicle panel structure that has no folding line while providing required rigidity.

Figure 2:
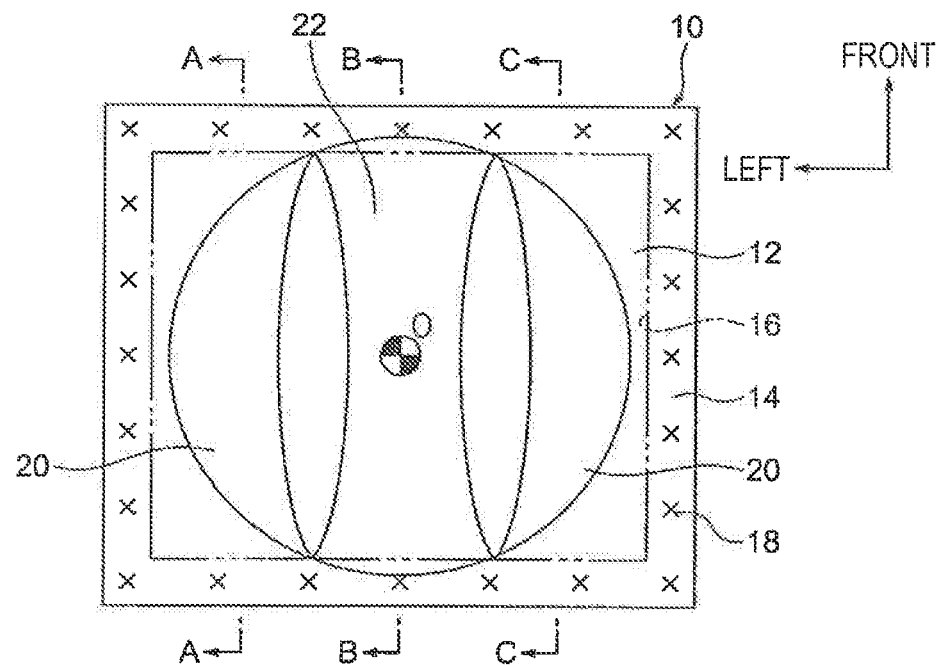
FIG. 2 is an explanatory diagram of the floor panel of FIG. 1.
Figure 2:
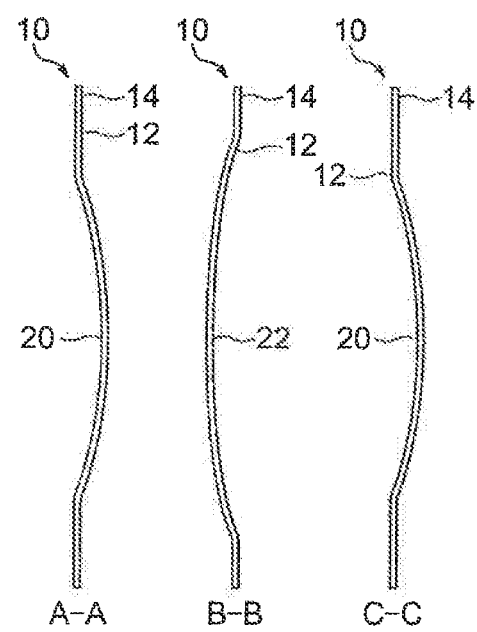

FIG. 1 is a perspective view of a floor panel having the vehicle panel structure according to the example of the present invention. FIG. 2 is an explanatory diagram of the floor panel. FIG. 2 schematically illustrates the floor panel to facilitate understanding. FIG. 1 illustrates the floor in front of a left rear seat of, for instance, a station wagon or other passenger vehicle. As is the case for JP-A No. 2006-76394, a thick sound-absorbing material and a thin sound-insulating material are placed on the floor panel 10 inside the passenger compartment.

Like a conventional floor panel, the floor panel 10 according to this example is made of a plate-like steel panel member 12. The shape of the panel member 12 according to this example is substantially square in plan view. The floor panel 10 to be described below in this example is illustrated in the middle of FIG. 1 and is secured by, for instance, spot welding at a circumferential edge thereof to, for instance, a floor tunnel, a side sill, a cross member, and other components constituting a framework of a vehicle body or so-called vehicle body members 16. In FIG. 1, reference symbol x indicates a restraining point 18 at which the floor panel 10 is restrained by the vehicle body members 16 by means of spot welding (welding points other than those in the floor panel 10 according to the example are omitted). Areas in which the floor panel 10 is attached to the vehicle body members 16 are plate-like as a whole, although slightly curved or inclined in some parts, and are collectively referred to as attaching areas 14. The floor panel 10 may be attached (or secured) to the vehicle body members 16 by means of continuous welding.

In this example, a pair of projections 20 projecting to the outside of the passenger compartment, more specifically, downward from the vehicle is formed in the floor panel 10 within the attaching area 14 so as to be arranged in parallel rows in the vehicle-width direction. The projections 20 are formed by subjecting the panel member 12 constituting the floor panel 10 to press-forming or another bending process. The projections 20 may have uniform curvature in the longitudinal direction or in the vehicle-width direction at a minimum and may be formed in a spherical shape having uniform curvature in its entirety. In addition, the pair of projections 20 may or may not be symmetrical, but preferably may have the same curvature in the longitudinal direction or in the vehicle-width direction.

Curved surfaces constituting the projections 20 are configured to have relatively small curvature and the extent to which the projections 20 project to the outside of the passenger compartment is set to be relatively small. In this example, a circumferential edge of the projections 20, more specifically, a connecting area between the attaching area 14 and the projections 20 is configured to be curved. In addition, the connecting area between the attaching area 14 and the projections 20 consists of a curved surface having relatively small curvature.

Furthermore, in this example, a reinforcing projection 22 is formed between the two projections 20 so as to project in the opposite direction of the projections 20 or toward the inside of the passenger compartment (or upward of the vehicle). The reinforcing projection is also formed by subjecting the panel member 12 constituting the floor panel 10 to press-forming or another bending process. The reinforcing projection 22 is disposed between the two projections 20 so as to extend continuously to the two projections 20. The reinforcing projection 22 consists of a curved surface in its entirety. The reinforcing projection 22 may have uniform curvature in the longitudinal direction or in the vehicle-width direction at a minimum and may be formed in a spherical shape having uniform curvature in its entirety. In this example, through an appropriate configuration of the curvature and shape of the projections 20 and the reinforcing projection 22, the connecting area between the projections 20 and the reinforcing projection 22 is configured to be curved. As is the case with the projections 20, a curved surface constituting the reinforcing projection 22 is configured to have relatively small curvature and the extent to which the reinforcing projection 22 projects to the outside of the passenger compartment is set to be relatively small. With this arrangement, the projections 20 and the reinforcing projection 22 form a wavy shape which can enhance the rigidity of the floor panel 10. At the same time, the wavy form is configured to have a small amplitude, thereby reducing the extent to which the projections 20 and the reinforcing projection 22 project to the outside and the inside of the passenger compartment. Consequently, the panel member 12 has a gentle contour within a section from the projections 20 to the reinforcing projection 22 or from the reinforcing projection 22 to the projections 20.

In addition, in this example, ends of the reinforcing projection 22 in the direction perpendicular to the direction (vehicle-width direction) in which the pair of projections 20 is disposed, more specifically, in the longitudinal direction of the vehicle, are configured to be located outside of ends in the longitudinal direction of the projections 20. Furthermore, in this embodiment, the ends of the reinforcing projection 22 positioned at the attaching area 14 have curved surfaces. In addition, the ends of the reinforcing projection 22 that are located in the direction perpendicular to the direction (vehicle-width direction) in which the pair of projections 20 is disposed, more specifically, in the longitudinal direction of the vehicle, and that have curved surfaces at the attaching area 14 are configured to be positioned in an area that overlaps part of the vehicle body member 16. In FIG. 2, for instance, a rectangle indicated by a two-dot chain line represents inner ends of the vehicle body member 16, and the curved ends in the longitudinal direction of the reinforcing projection 22 are positioned in an area that overlaps part of the vehicle body member 16. Though the panel member 12 constituting the floor panel 10 is secured (or welded) to the vehicle body member 16 at the attaching area 14 as described above, connecting areas between the vehicle body member 16 and the attaching area 14 have curved ends by causing the curved ends in the longitudinal direction of the reinforcing projection 22 to be positioned in an area that overlaps part of the vehicle body member 16. The connecting areas between the vehicle body member 16 and the attaching area 14 consist of curved surfaces having relatively small curvature.

A center O of the reinforcing projection 22 illustrated in, for instance, FIG. 2 is located substantially at the center of the panel member 12 constituting the floor panel 10 and has a large amplitude when subjected to an input load perpendicular to a curved surface of the reinforcing projection 22. When the center O of the reinforcing projection 22 is subjected to an input load in the vertical direction of the vehicle or in the direction perpendicular to the diagram of FIG. 2, most of the load is transmitted from the connecting areas between the vehicle body member 16 and the attaching area 14 to the attaching area 14 via a projecting surface of the reinforcing projection 22 and a ridge of the reinforcing projection 22. The load transmitted to the attaching area 14 is exerted mostly along the surface. As described above, since the attaching area 14 is secured to the vehicle body member 16 by means of spot welding, the load exerted along the attaching area 14 acts on the restraining points 18 of the attaching area 14 in the direction of shear. In addition, a load transmitted from the reinforcing projection 22 to the projections 20 is also transmitted to the attaching area 14 in the end, acting on the restraining points 18 of the attaching area 14 in the direction of shear. As described below, spot welding has stable restraining strength against a load exerted in the direction of shear. For this reason, a load that is exerted on the restraining points 18 from the attaching area 14 in the direction of shear is effectively transmitted to the vehicle body member 16, thereby reducing a load that may result in noise and vibration.

Figure 3:
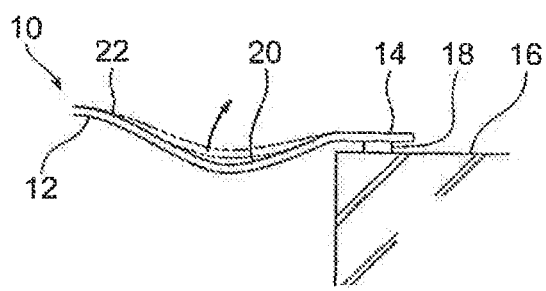
FIG. 3 is an explanatory diagram of how the floor panel of FIG. 1 works.

FIG. 3 schematically illustrates how the floor panel 10 of FIGS. 1 and 2 behaves when subjected to a load. In FIG. 3, reference symbol 16 represents the vehicle body member, while reference symbol 18 represents the spot-welded restraining point of the attaching area 14. The direction in which a load is applied is indicated by an arrow. In the floor panel 10 according to this example, the connecting areas between the projections 20 projecting so as to be curved toward the outside of the passenger compartment and the reinforcing projection 22 so as to be curved toward the inside of the passenger compartment have curved surfaces, while the connecting areas between the projections 20 and the attaching area 14 and the connecting areas between the reinforcing projection 22 and the attaching area 14 also have curved surfaces, giving no folding line in the panel member 12. For this reason, even when subjected to a load indicated by an arrow in the figure, the panel member 12 experiences no deterioration in rigidity, thereby avoiding deterioration in rigidity of the floor panel 10 mounted in the vehicle.

Figure 4:
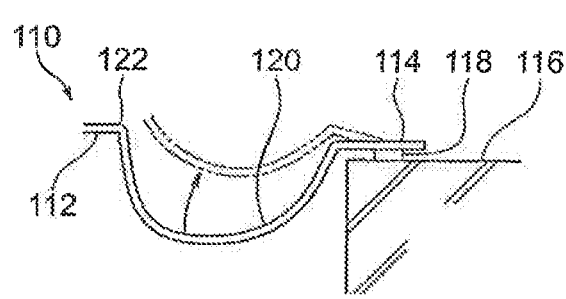
FIG. 4 is an explanatory diagram of how a conventional floor panel works.

FIG. 4 schematically illustrates how a floor panel 110, described in JP-A No. 2006-76394, behaves when subjected to a load. In FIG. 4, reference symbol 116 denotes a vehicle body member, while reference symbol 118 denotes a spot-welded restraining point of an attaching area 114. In the floor panel 110 described in JP-A No. 2006-76394, a panel member 112 is bent linearly at a connecting area between projections 120 and an attaching area 114 and a connecting area between a bead 122 and the projections 120. For this reason, when a load indicated by the arrow in FIG. 4 is exerted, an area in which the panel member is bent linearly creates a folding line. This may pose a concern about deterioration in rigidity of the floor panel 110 mounted in the vehicle.

Figure 5:
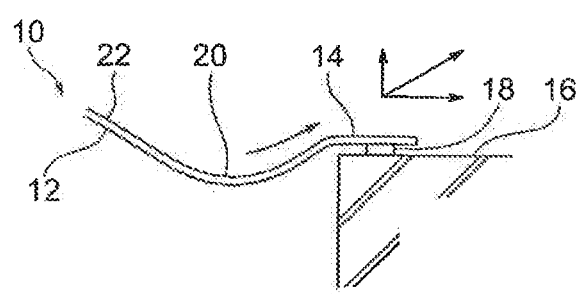
FIG. 5 is an explanatory diagram of how the floor panel of FIG. 1 works.

FIG. 5 schematically illustrates how a load is transmitted to the restraining point 18 spot-welded to the vehicle body member 16 when a load is exerted on the floor panel 10 in FIGS. 1 and 2. As described above, in the floor panel 10 according to this example, a surface spanning, for instance, from the reinforcing projection 22 to the projections 20 is mildly curved. When a load is exerted in the direction indicated by an arrow, a vector analysis of the load transmitted to the restraining point 18 indicates that most of the load is exerted along the surface of the floor panel 10, more specifically, on the restraining point 18 in the direction of shear in which the restraint is sheared. The spot-welded restraining point 18 is not stable when subjected to a load in the direction of tear in which the restraint is torn away, but exerts a stable restraining strength against a load in the direction of shear. For this reason, as a load is exerted on the spot-welded restraining point 18 in the direction of shear to a greater degree, it becomes more possible to make the restraining more stable. Accordingly, the spot-welded restraining point 18 between the floor panel 10 according to this example and the vehicle body member 16 has stable restraining strength.

Figure 6:
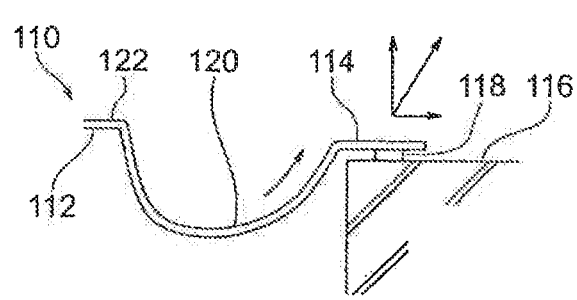
FIG. 6 is an explanatory diagram of how the conventional floor panel works.

FIG. 6 schematically illustrates how a load is transmitted to the restraining point 118 spot-welded to the vehicle body member 116 when a load is exerted on the floor panel 110 described in JP-A No. 2006-76394. FIG. 6 illustrates the projection 120 in which the curvature and the extent to which the projection 120 projects to the outside of the passenger compartment are greater. As a result, the surface of the panel member 112 spanning, for instance, from the bead 122 to the projection 120 to the attaching area 114 is steeply curved. When a load is exerted in the direction indicated by an arrow, a vector analysis of the load transmitted to the restraining point 118 indicates that most of the load is exerted in the direction in which the floor panel 110 is torn away, more specifically, on the restraining point 118 in the direction of tear. As a result, the restraining point 118 spot-welded to the vehicle body member 116 has unstable restraining strength in the floor panel 110 illustrated in FIG. 6.

As described above, in the vehicle panel structure according to this example, the pair of projections 20 is formed so as to project from the panel member 12. In addition, the reinforcing projection 22 continuously extending to the projections 20 is formed so as to be curved toward the opposite side of the projections 20. With this arrangement, one of the curved-surface projections 20, the curved-surface reinforcing projection 22, and the other of the curved-surface projections 20 form a wavy shape on the inside of the attaching area 14, which ensures specific rigidity while reducing the extent of projection to the inside and the outside of the passenger compartment. At the same time, a connecting area between the projections 20 and the reinforcing projection 22 has a curved surface, giving no folding line in the projections 20 or the reinforcing projection 22. This arrangement suppresses deterioration in rigidity of the panel member 12 mounted in the vehicle.

In addition, the ends of the reinforcing projection 22 in the longitudinal direction perpendicular to the direction in which the pair of projections 20 is disposed are located beyond the ends in the longitudinal direction of the projections 20. With this arrangement, an input load exerted on the reinforcing projection 22 can be effectively transmitted to the attaching area 14, more specifically, the restraining point 18 spot-welded to the vehicle body member 16, thereby reducing an input load that may result in noise and vibration.

Furthermore, the ends of the projections 20 positioned at the attaching area 14 have curved surfaces and the ends of the reinforcing projection 22 positioned at the attaching area 14 also have curved surfaces. With this arrangement, not only the connecting area between the projections 20 and the reinforcing projection 22 but also the connecting area between the projections 20 and the attaching area 14 and the connecting area between the reinforcing projection 22 and the attaching area 14 have no folding line, thereby reliably avoiding deterioration in rigidity of the panel member 12 mounted in the vehicle.

In addition, the ends of the reinforcing projection 22 that are located in the direction perpendicular to the direction in which the pair of projections 20 is disposed and that have curved surfaces at the attaching area 14 are positioned at an area that overlaps part of the vehicle body member 16. With this arrangement, ends of the connecting area between the attaching area 14 and the vehicle body member 16 have curved surfaces with no folding line, thereby avoiding deterioration in rigidity of the panel member 12 mounted in the vehicle.

Although the reinforcing projection 22 is formed between the pair of projections 20 arranged in parallel rows in the vehicle-width direction in the example described above, the direction in which the projections 20 are arranged is not limited to this. For instance, the reinforcing projection 22 may be formed between the pair of projections 20 arranged in line in the longitudinal direction.

In addition, although the pair of projections 20 project to the outside of the passenger compartment and the reinforcing projection 22 projects to the inside of the passenger compartment in the example described above, the opposite is also acceptable. More specifically, the pair of projections 20 may project to the inside of the passenger compartment, while the reinforcing projection 22 may project to the outside of the passenger compartment through between the projections 20.

Needless to say, various modifications to the example described above are conceivable within the scope of the present invention. Accordingly, the technical scope of the present invention is defined only by the matters used to specify the invention that are described in the claim scope and that are deemed appropriate from the above description.

The invention claimed is:

1. A vehicle panel structure comprising:
   a plate-like panel member comprising:
      a substantially plate-like attaching area that is configured to be attached to a vehicle body member;
      a pair of projections with each projecting so as to be curved toward one side of the attaching area; and
      a reinforcing projection that projects between each member of the pair of projections so as to be curved toward the other side of the attaching area,
   wherein the projections and the reinforcing projection are connected to each other with a connecting area therebetween so as to extend continuously in a curved shape,
   wherein each of the reinforcing projection and pair of projections share a common direction of elongation, and wherein the ends of the reinforcing projection are located beyond respective ends of the projections relative to the direction of elongation.

2. The vehicle panel structure according to claim 1, wherein the ends of the projections located at the attaching area have curved surfaces and the ends of the reinforcing projection located at the attaching area have curved surfaces.

3. The vehicle panel structure according to claim 2, wherein the ends of the reinforcing projection are positioned in an area that overlaps the vehicle body member.

4. The vehicle panel structure according to claim 1, wherein the vehicle panel structure is in the form of a floor panel structure, and the pair of projections are curved so as to extend down and project below the attachment area, while the reinforcing projection is curved so as to extend up into a passenger compartment area extending above the floor panel structure.

5. The vehicle panel structure according to claim 1, wherein the pair of projections are symmetrical.

* * * * *